United States Patent
Li et al.

(10) Patent No.: US 11,409,769 B2
(45) Date of Patent: Aug. 9, 2022

(54) COMPUTER-IMPLEMENTED METHOD AND SYSTEM FOR ATTRIBUTE DISCOVERY FOR OPERATION OBJECTS FROM OPERATION DATA

(71) Applicant: INTERNATIONAL BUSINESS MACHINES CORPORATION, Armonk, NY (US)

(72) Inventors: Jia Qi Li, Beijing (CN); Fan Jing Meng, Beijing (CN); Jing Min Xu, Beijing (CN); Zi Xiao Zhu, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 277 days.

(21) Appl. No.: 16/819,138

(22) Filed: Mar. 15, 2020

(65) Prior Publication Data

US 2021/0286826 A1   Sep. 16, 2021

(51) Int. Cl.
*G06F 16/00* (2019.01)
*G06F 16/28* (2019.01)
*G06F 17/18* (2006.01)
*G06Q 10/10* (2012.01)

(52) U.S. Cl.
CPC .......... *G06F 16/284* (2019.01); *G06F 17/18* (2013.01); *G06Q 10/10* (2013.01)

(58) Field of Classification Search
CPC ........ G06F 16/284; G06F 17/18; G06F 16/24; G06F 16/43; G06F 16/903; G06F 16/951; G06Q 10/10; H04L 67/10
See application file for complete search history.

(56) References Cited

U.S. PATENT DOCUMENTS

| | | | | |
|---|---|---|---|---|
| 7,639,868 | B1* | 12/2009 | Regli | G06K 9/62 706/20 |
| 7,827,186 | B2* | 11/2010 | Hicks | G06Q 30/0603 707/750 |
| 8,862,728 | B2 | 10/2014 | Jayachandran et al. | |
| 9,244,983 | B2* | 1/2016 | Yang | G06F 16/9024 |
| 10,505,825 | B1* | 12/2019 | Bettaiah | G06F 16/24578 |
| 10,725,982 | B2* | 7/2020 | Scheideler | G06F 16/9024 |

(Continued)

OTHER PUBLICATIONS

List of IBM Patents or Patent Applications Treated as Related (2 pgs.).

(Continued)

*Primary Examiner* — Noosha Arjomandi
(74) *Attorney, Agent, or Firm* — Intelletek Law Group, PLLC; Gabriel Daniel, Esq.

(57) ABSTRACT

A system and method for attribute discovery for operation objects from operation data includes segmenting a name of each of a plurality of operation objects based on one or more special characters used in the name of each operation object. A similarity comparison of the operation objects is performed by extracting common subsequences from substrings in operation data in a same log as a target object, and a string similarity is computed of the extracted common subsequences. Numerical attributes are determined by calculating statistical metrics for fields in the log, and additional information of the operation objects is discovered based on the determined numerical attributes.

17 Claims, 10 Drawing Sheets

(56) References Cited

U.S. PATENT DOCUMENTS

| | | | |
|---|---|---|---|
| 11,244,345 B2* | 2/2022 | Pradeep | A61B 5/377 |
| 2004/0078364 A1* | 4/2004 | Ripley | G06F 16/284 |
| 2004/0143508 A1* | 7/2004 | Bohn | G06Q 30/02 |
| | | | 705/26.1 |
| 2004/0243548 A1* | 12/2004 | Hulten | G06F 16/2462 |
| 2007/0038938 A1* | 2/2007 | Canora | G11B 27/034 |
| 2008/0184001 A1 | 7/2008 | Stager | |
| 2008/0213768 A1* | 9/2008 | Cai | C12Q 1/6883 |
| | | | 435/6.12 |
| 2009/0024555 A1* | 1/2009 | Rieck | G16B 40/20 |
| | | | 706/54 |
| 2010/0332540 A1 | 12/2010 | Moerchen et al. | |
| 2011/0225173 A1* | 9/2011 | Gulhane | G06V 30/268 |
| | | | 707/E17.069 |
| 2012/0323921 A1* | 12/2012 | Chen | G06F 16/313 |
| | | | 707/E17.09 |
| 2014/0074764 A1 | 3/2014 | Duftler | |
| 2015/0170022 A1 | 6/2015 | Malik et al. | |
| 2016/0124823 A1* | 5/2016 | Ruan | G06F 11/079 |
| | | | 714/26 |
| 2017/0132060 A1 | 5/2017 | Nomura et al. | |
| 2017/0185910 A1* | 6/2017 | Appel | G06F 16/24578 |
| 2017/0186249 A1 | 6/2017 | Bandy et al. | |
| 2017/0213127 A1* | 7/2017 | Duncan | G16B 50/30 |
| 2017/0249200 A1 | 8/2017 | Mustafi et al. | |
| 2017/0262429 A1 | 9/2017 | Harper | |
| 2017/0270154 A1 | 9/2017 | Stephens | |
| 2018/0144041 A1 | 5/2018 | Chen et al. | |
| 2019/0058643 A1 | 2/2019 | Knowles et al. | |
| 2019/0095313 A1 | 3/2019 | Xu | |
| 2019/0303459 A1* | 10/2019 | Yan | G06F 16/35 |
| 2020/0004813 A1* | 1/2020 | Galitsky | G06F 16/9027 |
| 2021/0286826 A1* | 9/2021 | Li | G06F 17/18 |
| 2022/0032982 A1* | 2/2022 | Shenton | G06T 7/70 |

OTHER PUBLICATIONS

Mell, P. et al., "Recommendations of the National Institute of Standards and Technology"; NIST Special Publication 800-145 (2011); 7 pgs.

Debnath, B. et al., "LogLens: A Real-time Log Analysis System"; IEEE 38th International Conference on Distributed Computing Systems (2018), pp. 1052-1062.

Lin, Q. et al., "Log Clustering based Problem Identification for Online Service Systems"; ICSE (2016); 10 pgs.

Xu, W. et al., "Detecting Large-Scale System Problems by Mining Console Logs"; EECS Department, University of California at Berkeley, USA (2009); 16 pgs.

\* cited by examiner

300B

Similarity computation — 350
Longest common subsequence
String similarity computation
(max number & position)

⇧ 353

Eg.
Object:request_id
{default-890a8a1a-bbc8-47d1909f2}
Attribute:
request_time_ms: 0.596
request_uri: /status/info
request_method: GET
request_size: 1616

Statistical Analysis & Computation — 360
count the total values of a field and compute its statistical metrics

⇧ 363

Eg.
Object:Transaction
3u472476879124
Attribute:
Duration: 00:00:42 ← Total

Sequence mining — 370
Eg. sequence mining

⇧ 373

Eg.
Object:threadId {II-server-thread-53}
Attribute:
Timestamp    Thread
Transaction_id
May 21st 2019, 13:12:34.000 II-server-thread-53
7514173bc2786d7567107d
May 21st 2019, 13:12:34.000 II-server-thread-53
7514173bc2786d7567107d
May 21st 2019, 13:12:34.000 II-server-thread-53
7514173bc2786d7567107d
May 21st 2019, 13:12:03.000 II-server-thread-53
531e2c23f8ca728ab5ha6b8e6
May 21st 2019, 13:12:03.00 II-server-thread-
531e2c23f8ca728ab5bha6b8e6
May 21st 2019, 13:12:03.000 II-server-thread-53
87b67e2bd20682be596f5

⇧ 375

Eg.
Object:threadId {II-server-thread-53}
Attribute:
Timestamp    Transaction    Msg
May 21st 2019, 13:12:34.000 7514173bc2786d756
May 21st 2019, 13:12:34.000 7514173bc2785d753 DialogRuntimeRequest finished for APPLY_MODEL
May 21st 2019, 13:12:34.000 7514173bc2786d753  Required workspace revision "89114327629331 0768"
May 21st 2019, 13:12:34.000 7514173bc2785d756
DialogHealthCheckRequest finished for APPLY_MODEL
May 21st 2019, 13:12:03.000 31e2c23f8ca728ab5 be primary cache for workspace deef8e475-1251-4e2c-
May 21st 2019, 13:12:03.00 1e2c23f8ca728ab5bf  Required workspace revision:"8461456419484156263"

FIG. 3B

COMPUTER-IMPLEMENTED METHOD AND SYSTEM FOR ATTRIBUTE DISCOVERY FOR OPERATION OBJECTS FROM OPERATION DATA

BACKGROUND

Technical Field

The present disclosure generally relates to hybrid cloud and multi-cloud computing. More particularly, the present disclosure relates to workload distribution across a hybrid cloud or a multi-cloud environment.

Description of the Related Art

There continues to be an increase in the use of cloud computing, particularly distributing a workload across a hybrid cloud or multi-cloud computing environment. Hybrid cloud computing and multi-cloud computing provide multiple platforms for sharing and processing operation data.

SUMMARY

According to various embodiments, a computer-implemented method, system, and non-transitory machine readable medium for attribute discovery for operation objects from operation data are disclosed herein.

In one embodiment, a computer-implemented method for attribute discovery of operation objects from operation data includes segmenting a name of each of a plurality of operation objects based on one or more special characters used in the name of each operation object. A similarity comparison of the operation objects is performed by extracting attributes from substrings in operation data in the same log as a target object. A string similarity is of the extracted common substrings is computed to compare a maximum number and position of one or more subsequences in each string to generate a matching value indicating an amount of a match of one or more subsequences. Numerical attributes are determined by calculating statistical metrics for fields in the log, and additional information of the operation objects is discovered based on the determined numerical attributes and the matching value.

In an embodiment, the attribute discovery is performed automatically in real time without predetermined information regarding the names of fields in the log and a relationship among the fields.

In an embodiment, the extracting common subsequences from the operation data includes finding one or more common subsequences in the log having a longest length.

In an embodiment, the complex attribute mining of structured attributes includes one or more of a sequence, a sub-graph or a sub-set of the operation data, and stitching the fields of the structured attributes.

In an embodiment, the stitched fields of the structured attributes include values at predetermined timestamps revealing operations using attributes obtained from sequence mining.

In an embodiment, the sequence mining includes identifying multiple successor entities for a target entity. An occurrence of times of each entity in a successor group is computed, and a type of substructure for the successor group is identified.

In an embodiment, the identified type of substructure for the successor group is a forked sequence substructure or a sequential sequence substructure.

In one embodiment, a system for attribute discovery of operation objects from operation data includes a word segmentation module configured to segment a name of each of a plurality of operation objects based on one or more special characters used in the name of each operation object. A similarity comparison module is configured to compare the operation objects by extracting subsequences from substrings of operation data in the same log as a target object. A string similarity of the extracted common subsequences is computed to compare a maximum number and position of the common subsequences in each substring to generate a matching value indicating an amount of a match of the extracted common subsequences. A statistical analysis and computation module configured to determine attributes by calculating statistical metrics for fields in the log, and to identify additional information of the operation objects based on the determined attributes and the matching value.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 3B is an example of similarity computation, statistical analysis and computation, and sequence mining, consistent with an illustrative embodiment.

DETAILED DESCRIPTION

Overview

Figure 1:
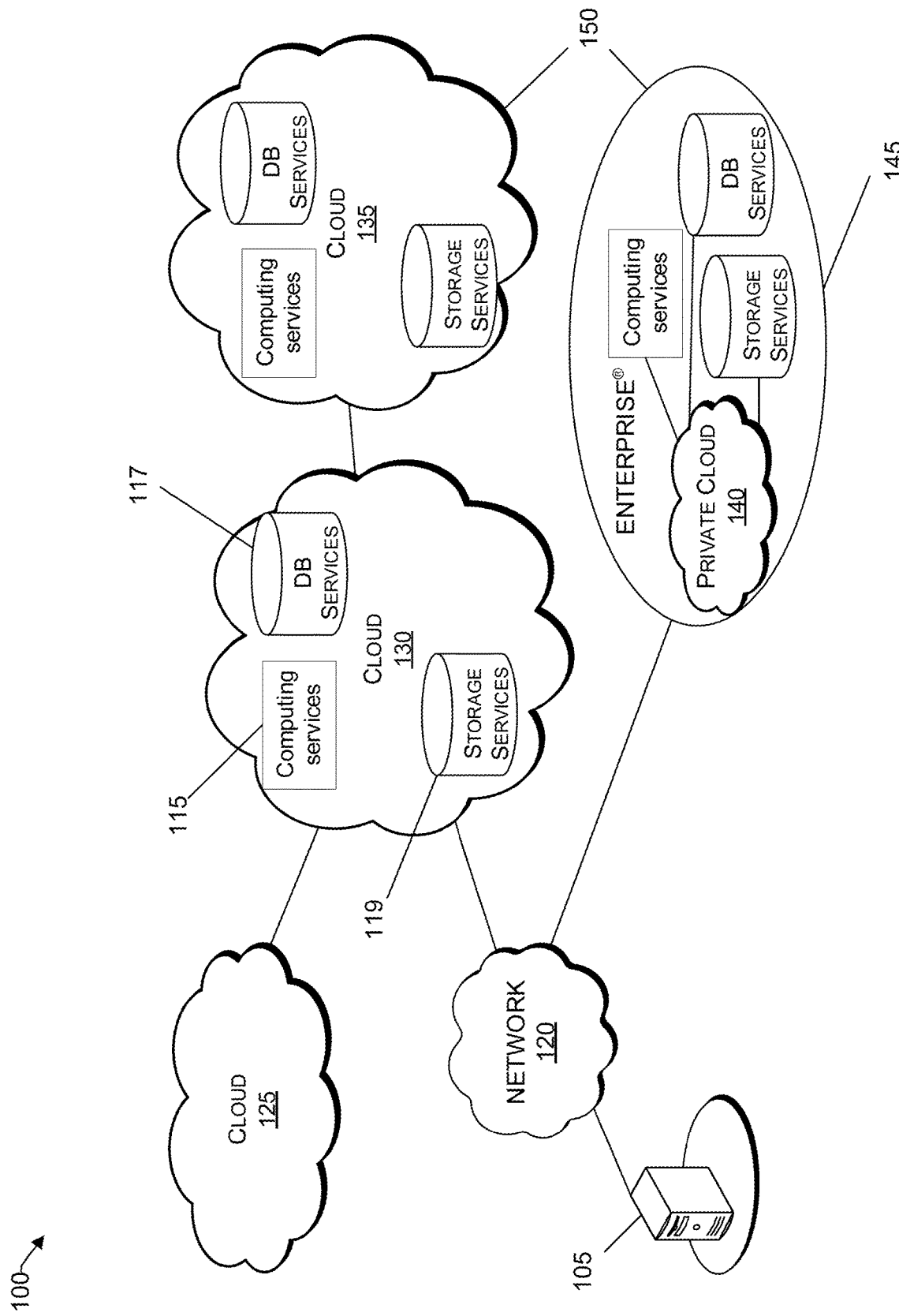
FIG. 1 is an illustration of a multi-cloud computing architecture, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Aspects of the present disclosure are applicable to both hybrid cloud computing and multi-cloud computing. Hybrid cloud computing is a type of strategy for operation of a single type of task. On the other hand, multi-cloud computing is a type of cloud management strategy in which several providers may be used to perform more than one type of task. It is to be understood that multi-cloud computing may include hybrid cloud computing as a component.

According to an illustrative embodiment of the present disclosure, the analysis and management of different operation data by performing attribute discovery of operation objects is discussed herein. For example, the extraction of one or more attributes for operation objections can provide for more efficient operation management by enriching the descriptive information for operation objects. According to an illustrative embodiment of the present disclosure, attributes of operational objects are extracted from operational data. In an embodiment, the process is operated automatically in real time without a prior identification of the names of fields, or relationships among the fields. Attributes are extracted from the same operational data as the operational objects it describes.

According to an embodiment of the present disclosure, operational data are segmented into different distributive systems separately, such as monitoring, logging, events, ticketing and a Configuration Management Data Base (CMDB). In one embodiment, the operational objects include logs, alerts, events, etc. Correlation of these events can be used to infer, or to detect, problems.

The various aspects of the present disclosure provide an improvement in multi-cloud and hybrid cloud operation by providing automatic multiple level monitoring and detection of operations, errors, faults, and warnings of various platforms that are operating across multiple clouds that would otherwise present significant difficulty in such monitoring and detection, and need manual intervention by a system reliability engineer with intimate knowledge of the operations. In addition, the present disclosure provides for an improvement in computer operations that is capable of monitoring multiple levels of multi-cloud operation from the various platforms to the infrastructure. Operation management is enhanced at least because of the enriched descriptive information of the objects.

Example Architecture

Multi-cloud computing architecture includes the components and subcomponents that are used for multi-cloud computing. For example, platforms such as a front end platform with front end software architecture, a back end platform with back end software architecture, a network and a multi-cloud based delivery. The front end architecture may include a user interface and enables the user to interact with cloud computing software. Web browsers, local networks and common web apps are examples of the front end software architecture. The back end architecture includes hardware and storage, and includes management and security.

FIG. 1 is an illustration 100 of a multi-cloud computing architecture, consistent with an illustrative embodiment. It is to be understood that the architecture shown in FIG. 1 is provided for illustrative purposes, and the present disclosure is not in any way limited to the arrangement shown and described. A user interface 105, which may include a server, laptop, desktop, tablet, smart device, etc., communicates with network 120 to access a multi-cloud environment 125, 130, 135, 140 that may include public clouds 125, 130, 135, and a private cloud 140 that is part of an Enterprise® platform 145.

Each of the public clouds 125, 130, 135 can include, for example, computing services 115, database services 117, and storage services 119. One or more of the clouds 125, 130, 135, 140 shown may have fewer services, or more services, than shown. The private cloud 140 that is part of the Enterprise® platform 145 in this illustrative embodiment, also includes the computing services 115, database services 117, and storage services 119. The hybrid cloud 150 is formed by, for example, a public cloud 135 and the Enterprise® platform 145 having the private cloud 140 managed by a user.

Example Block Diagram

Figure 2:
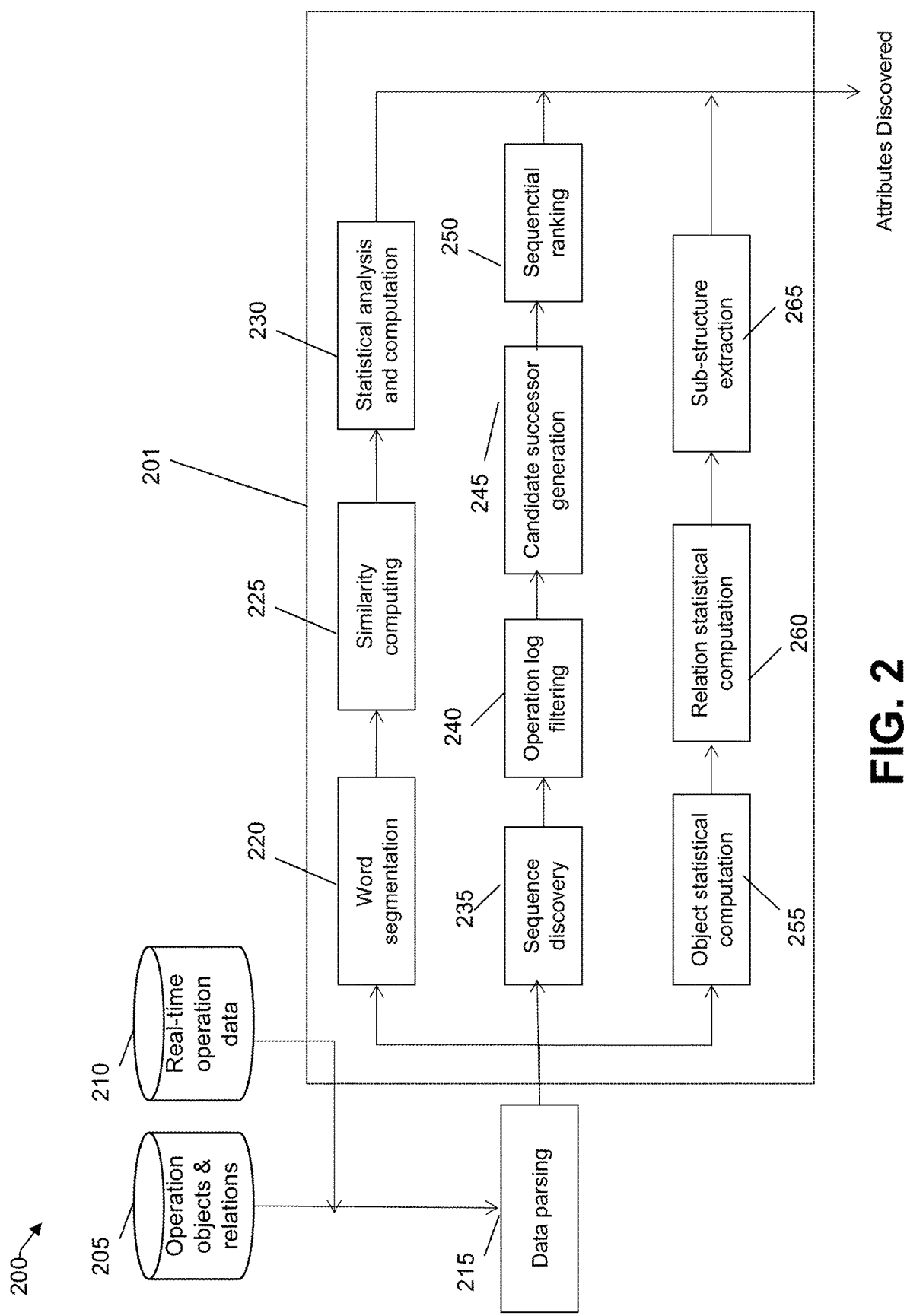
FIG. 2 is an illustration of a system for attribute discovery for operation objects from operation data, consistent with an illustrative embodiment.

Reference now is made to FIG. 2, which is an example block diagram of a system 200 that is configured for attribute discovery of operation objects from operation data, consistent with an illustrative embodiment. The system 200 includes an engine 201, which may include but is not in any way limited to a processing engine. The engine includes a plurality of modules that are configured to perform various operations, including attribute discovery according to the present disclosure. The engine 201 may be coupled to one or more storage devices including, for example, operation objects and relations data 205, and real-time operation data 210. Data parsing module 215 is also performed the real time operational data. It is to be understood that although the operation objects and relations 205, and real-time operation data are shown as being stored in logically separated storage, the present disclosure is not limited to such a configuration.

The engine 201 can include modules configured for word segmentation 220, similarity computing 225, statistical analysis and computation 230, sequence discovery 235, operation log filtering 240, candidate successor generation 245, sequential ranking 250, object statistical computation 255, relation statistical computation 260, and sub-nature extraction 265.

The word segmentation 220 module is configured to segment (e.g., parse) the name of each of the operation objects from operation data by using special characters in the name. The special characters can be any of the non-letter or number type, and can be limited to a smaller subset of the special characters, for example, from a larger group of special characters that may be present, for example, on an input device such as a keyboard, etc. It is also to be understood that the types of special characters are not limited to those used in a particular language.

The similarity computing attributes module 225 can be configured to extract the attributes from substrings of operation data. The operation data can be stored in logs, and in this illustrative embodiment, the attributes are extracted from the same log as a target object. A string similarity operation is computed based on the extracted attributes. The type of string similarity is not limited to any particular type of operation. For example, the similarity can be computed by generating a number equivalent to the number of substitutions and deletions performed to transform one string into another.

Figure 3A:
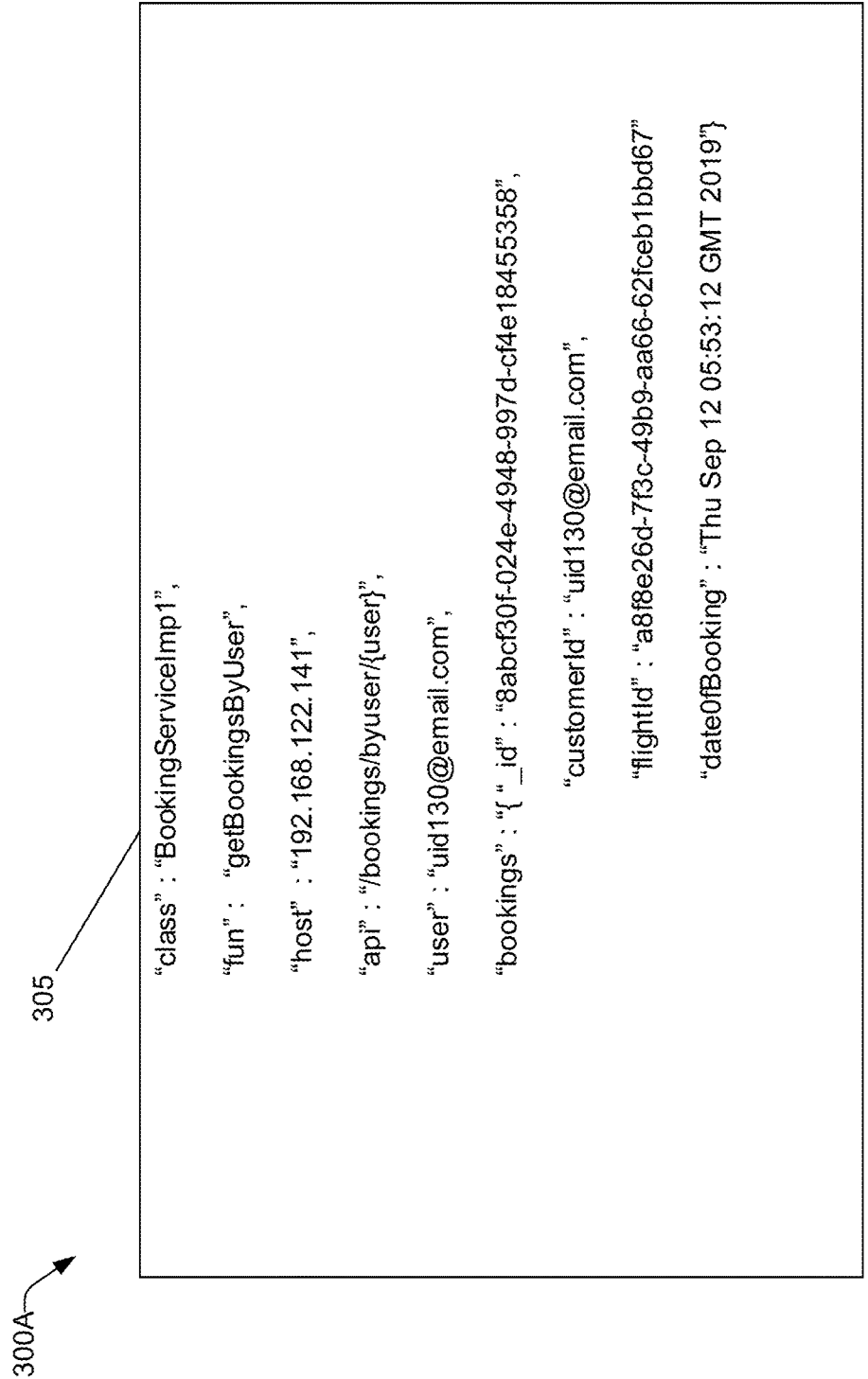
FIG. 3A is an illustrative example of log data, consistent with an illustrative embodiment.

The statistical analysis and computation module 230 calculates statistical metrics for fields in the log. FIG. 3A is one illustrative example of operational data from which attributes can be identified and extracted. There are various fields such as "class", "fun", "host", "api", "user", "bookings", "id", "customerID", flightId" and "dateofBooking". The fields in the log include various attributes, and the type of attributes can be text, numerical, or a combination of numerical and text attributes. The attributes determined by the statistical analysis and computation module 230 can be sequence attributes.

With continued reference to FIG. 2, the modules utilized for determining sequencing include the sequence discovery 235, operation log filtering 240, candidate successor generation 245, and sequential ranking 250. Object statistical computation 255 and relational statistical computation 266 of the operational objects is performed, and followed by sub-structure extraction 265, which can result in selection of a forked sequence structure, or a sequential sequence structure, as discussed with reference to FIG. 3B. It is to be understood that while the modules in FIG. 2 are shown as being logically separate, fewer modules or more modules may be used in which the configurations are combined.

Complex attribute mining of attributes may be performed including one of a sequence, sub-graph, or sub-set of the operation data. The fields can be stitched with various values at different timestamps revealing operations using sequence mining as attributes. The sequence mining is further discussed with reference to FIG. 5A.

It is also shown in FIG. 2 that the word segmentation module 220 is linked to the object statistical computation module 255. Along with the relational statistical module 260, and sub-structure extraction module 265, the relationships among the fields in the log can be determined in real time. In other words, in this illustrative embodiment, the attribute discovery can be performed in real time without predetermined identification information regarding names of fields in the log and a relationship among the fields in the log.

FIG. 3B is example of a similarity computation, statistical analysis and computation, and sequence mining 300A, consistent with an illustrative embodiment. In this embodiment, the operations include a similarity computation 350, statistical analysis and computation 360, and sequence mining 370. The similarity computation 350 is configured to find a longest subsequence among groups of substrings being compared. A string similarity computation of the common subsequences is performed, for example, to compare a maximum number and position of one or more subsequences in each string to generate a metric indicating how closely the strings are matched (e.g. an amount matching value). Box 353 shows an example with a request id, a request time, a URL, a method, and a request size.

The statistical analysis and computation 360 is configured, for example, to count the total values of a field and compute its statistical metrics. For example, in box 363 there is a transaction, an attribute field, and a duration. In box 364, the timestamp of the transactions are listed.

With continued reference to FIG. 3B, the sequence mining operation 370 is shown, in which an object thread, timestamp, and thread transaction are shown in boxes 373 and 375. The messages are also shown after the timestamp and transaction IDs, such as "Dialog runtime request finished for Apply-Model", etc. In addition, features such as log sequences and graph structures, which contains and depicts patterns of operation object behaviors and system interactions, are also extracted. For specific fields which have a global ID or specific ID as identifier, different objects are stitched from among all the logs in a sequential order using timestamps to get meaningful sequences.

Figure 4:
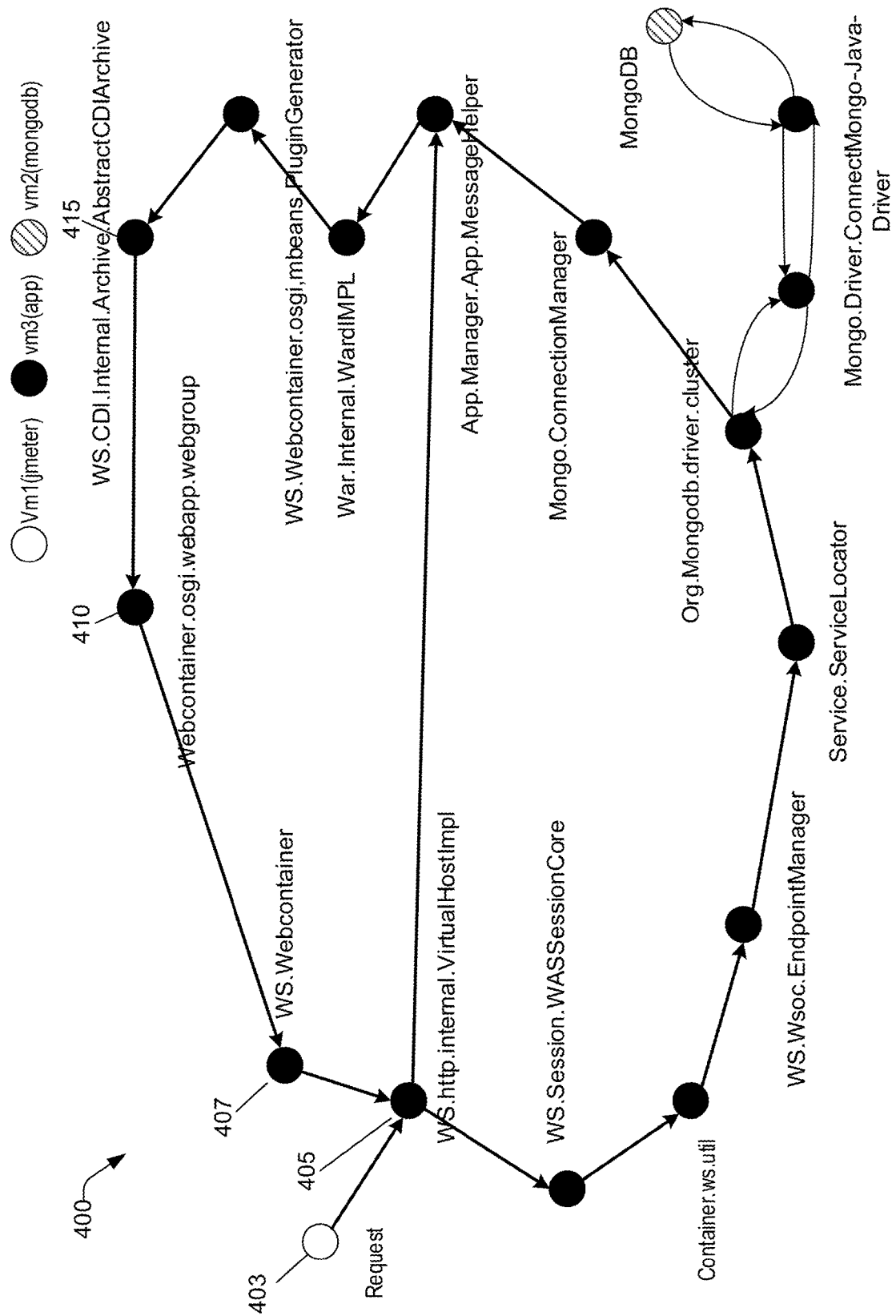
FIG. 4 is an illustration of service topology, consistent with an illustrative embodiment.

FIG. 4 shows an example of a service topology 400 consistent with an illustrative embodiment. There is shown a plurality of services, each identified by a name that is unique for the respective service topology. In storage there is, for example, a descriptive file listing for each service topology having a text that describes the respective service topology, the tasks performed by each service topology, their priority level, and a list of associated tasks. A request 403 for certain service tasks may be made to a service node ws.http.internal.virtualHost.IMPL 405. FIG. 4 also shows a number of different service topologies. For example, a ws.webcontainer 407, a webcontainer.osgi.webapp.Webgroup 410, and a ws.cdi.internal.archive.AbstractCDIArchive 415 are all marked. The service topologies are part of various systems (vm1, vm2 or vm3), and in this illustrative embodiment are associated with one of three vm groups identified with slightly different shades. The operation data from the various topologies can be stored in logs and operation objects and relations between them can be determined, for example, using sequence mining, as discussed herein below in detail in the following section.

Example Processes

Figure 5A:
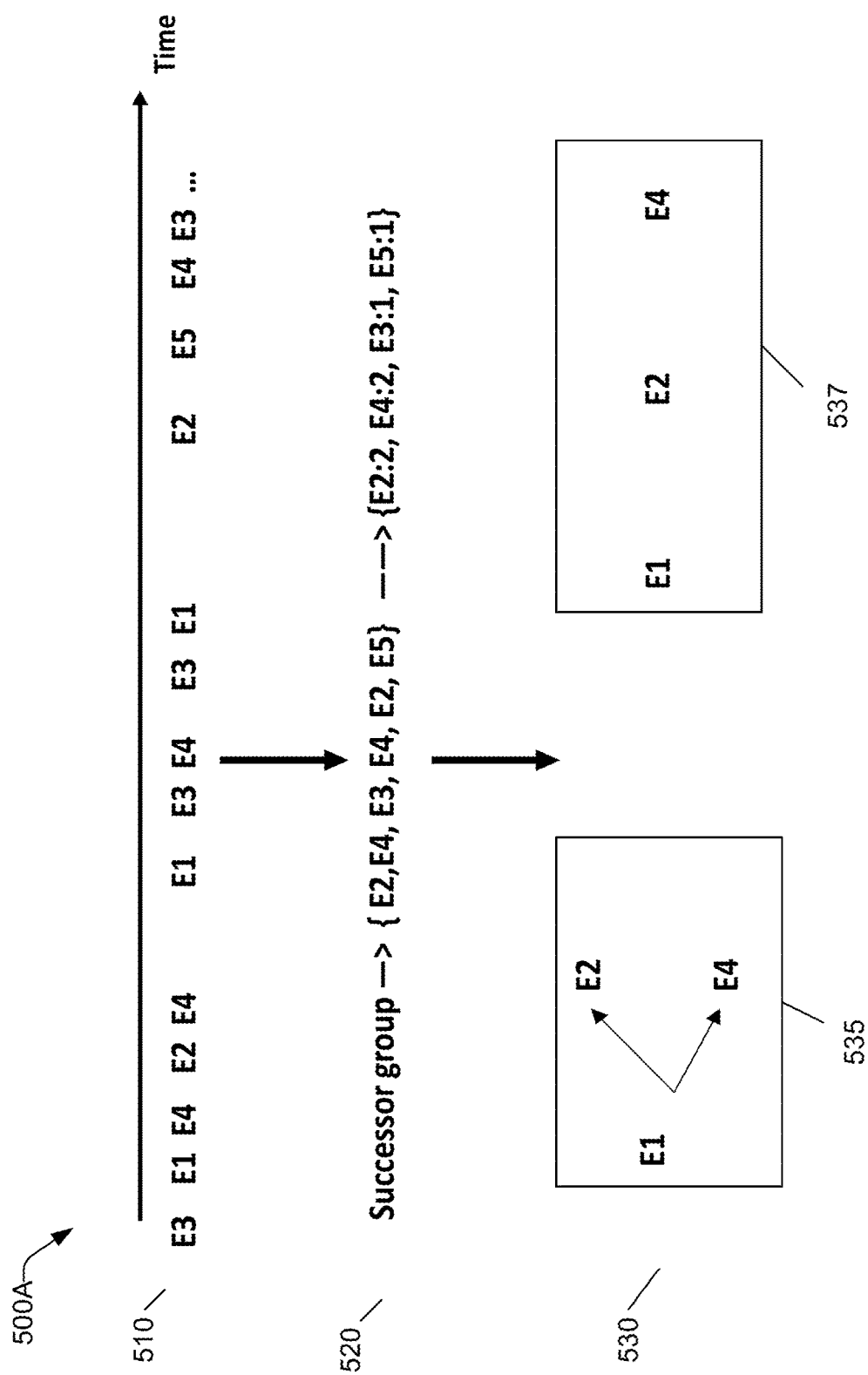
FIG. 5A is an illustration of sequence mining, consistent with an illustrative embodiment.
Figure 5B:
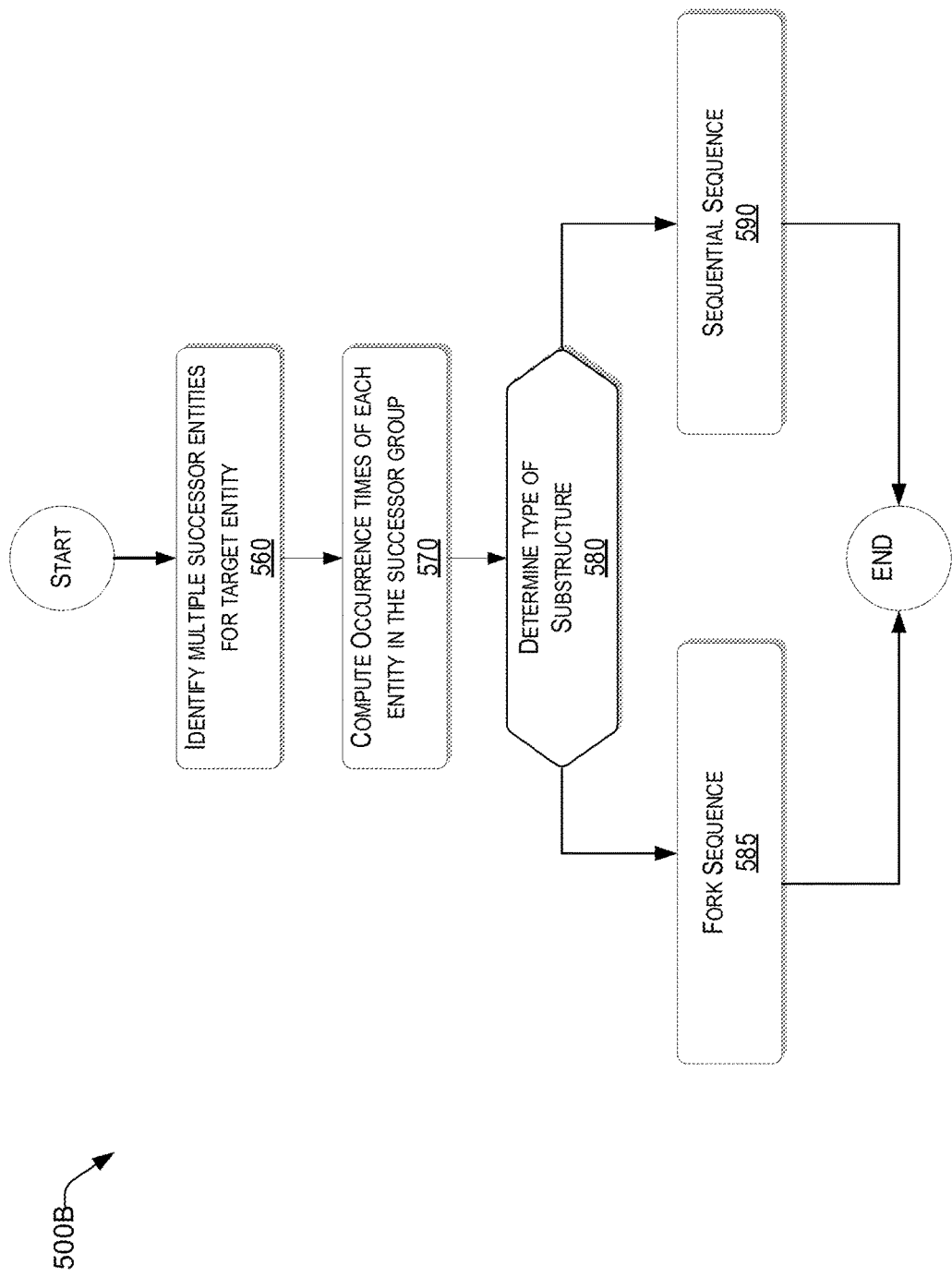
FIG. 5B is a flowchart illustrating the operations of a method of sequence mining used in attribute discovery, consistent with an illustrative embodiment.

With the foregoing overview of the example architecture 100 and a conceptual block diagram of a system 200, it may be helpful now to consider a high-level discussion of example processes. To that end, FIGS. 5A and 5B present illustrative processes related to various aspects of sequence mining, consistent with illustrative embodiments. Processes 500A and 500B of FIGS. 5A and 5B are each illustrated as a collection of processes in a logical flowchart, wherein each block represents a sequence of operations that can be implemented in hardware, software, or a combination thereof. In the context of software, the processes represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process.

FIG. 5A is an illustration 500A of sequence mining, consistent with an illustrative embodiment. Sequence mining is a technique for discovering a set of patterns shared among objects that have between them a specific order. For example, the patterns can be realized in the form of certain attributes, such as in error detection of target objects.

The first operation 510 finds several valid successor entities in a predetermined time period for the target entity. It is shown along the time line that #1 (first) successors are E2, E4, the #2 (second) successors are E3, E4, and #3 (third) successors are E2, E5.

A second operation 520 is performed to compute occurrence times of each entity in the successor group. In this example, the successor groups are shown with an occurrence count of the successors. For example, E2 is listed twice in the successor group {E2, E4, E3, E4, E2, E5} because E2 is present in the #1 successor entities and the #3 successor entities above the time line. Thus, in the second bracketed successor groups, rather than repeating the identified entity, a shorthand notation indicates the occurrence of a particular entity. For example, the successor group lists "E2:2", with the "2" identifying two occurrences. In addition, it can be seen that, E3 and E5 are present in the successor group once each (an occurrence of one), and thus they are listed as" E3:1" and "E5:1".

A third operation 530 is performed to remove noise successors and determine the substructure of the entities in the successor group. For example, a fork sequence substructure 535, and a sequential sequence substructure 537 are shown. One of these sub-structures is selected. While the sequence substructure 537 may be used in a serial group of entities that, for example, can be successive in time, the fork sequence substructure 535 may be used when for example, E2 and E4 occur substantially at the same time, or there is no dependence in the fork substructure on E4 with regard to E2. In other words, E2 and E4 in the fork substructure 535 are successors of E1 without an intervening successor.

FIG. 5B is a flowchart 500B illustrating the operations of a method of sequence mining, consistent with an illustrative embodiment. At operation 560, multiple successors for target entry are identified. The successors can be selected within a predetermined time period such as shown in operation 510 in FIG. 5A.

At operation 570, occurrence times of each entity in the successor group is computed. With reference to FIG. 5A, and the explanation herein above, the occurrence times can be a count of a quantity of a particular entity within a predetermined period.

At operation 580, the type of substructure is determined. For example, a fork sequence structure 585 or a sequential sequence structure is determined based on, for example, a sequence mining operation. The flowchart ends, and the selected type of substructure is then used for additional operations, such as identifying anomalies.

Example Cloud Platform

As discussed above, functions relating to managing one or more client domains, may include a cloud 125, 130, 135, 140 (see FIG. 1), and in multi-cloud and hybrid cloud computing as discussed with regard to FIG. 1. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
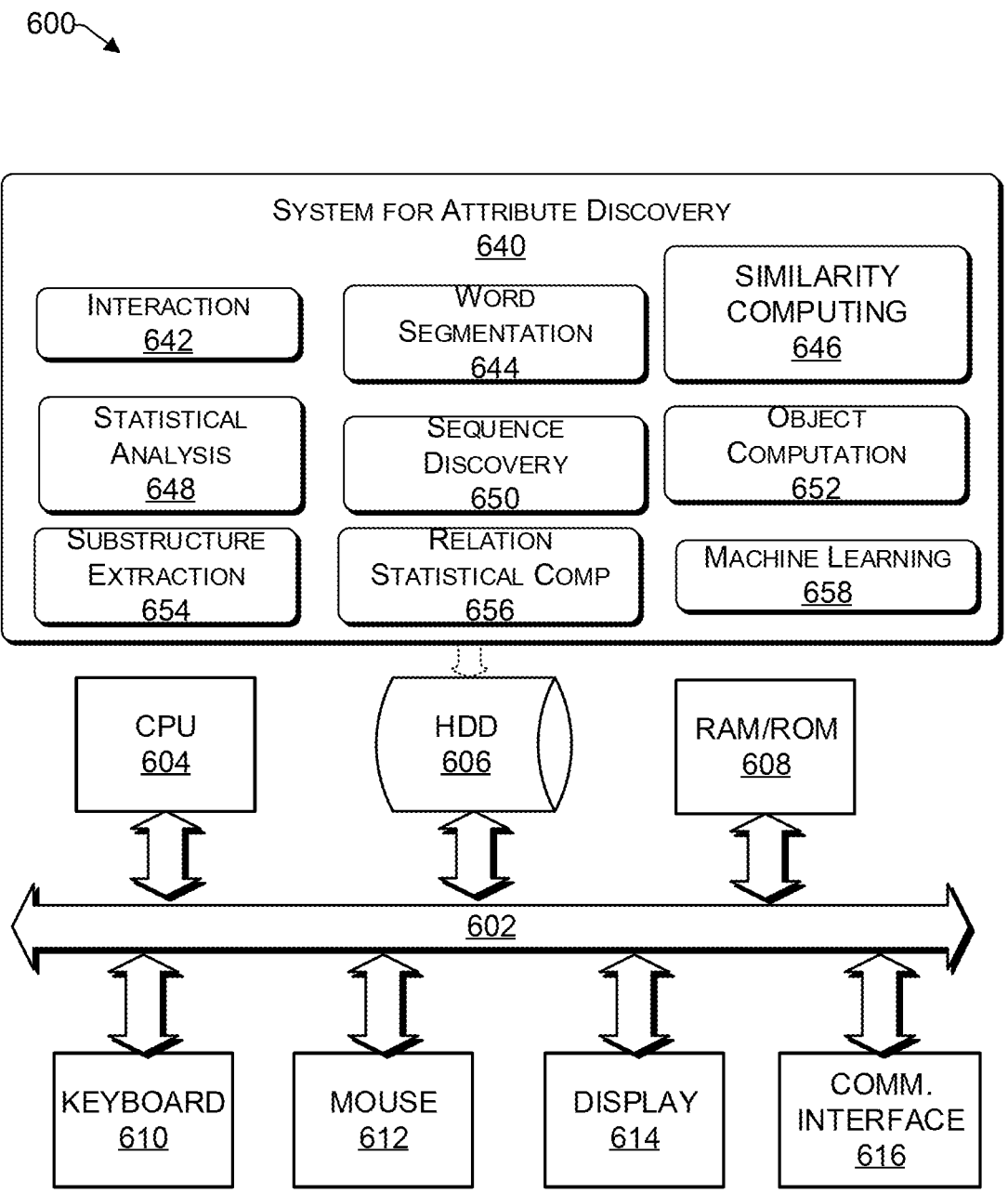
FIG. 6 is a functional block diagram illustration of a computer hardware platform that can communicate with various networked components, consistent with an illustrative embodiment.

Referring now to FIG. 6, functions relating to attribute discovery for operation objects from operation data can be performed with the use of one or more computing devices connected for data communication via wireless or wired communication, as shown in FIG. 1 and in accordance with the processes 500A to 500B of FIGS. 5A and 5B, respectively. FIG. 6 provides a functional block diagram illustration of a computer hardware platform that is capable performing attribute discovery for operation objects from operation data, as discussed herein. In particular, FIG. 6 illustrates a network or host computer platform 600, as may be used to implement an appropriately configured server, such as the server 105 of FIG. 1.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the engine 640, in a manner described herein. The engine 640 may have various modules configured to perform different functions.

For example, there may be an interaction module 642 that is operative to receive electronic data from various sources, including logs of real time operation data 210 (FIG.), operation objects and relations 205. The interaction module 642 may also be configured to present results regarding attribute discovery to an appropriate recipient (e.g., an administrator of the client domain being evaluated).

In one embodiment, there is a word segmentation module 644 operative to segment a name of each of a plurality of operation objects based on one or more special characters used in the name of each operation object. A similarity computing module 646 configured to compare operation objects by extracting attributes from operation data. A statistical analysis and computation module 648 is configured to determine attributes by calculating statistical metrics for fields in log data. An object computation module 652 is used to determine object statistics, that along with relational statistical computation module 654 that is in the process of performing sub-structure extraction. There may be a machine learning module 658 operative to learn from prior interactions with one or more client domains, during a training phase. The machine learning module 658 may also aid in identifying an appropriate source of an executable code for attribute discovery.

In one embodiment, a program, such as Apache™, can be stored for operating the system as a Web server. In one embodiment, the HDD 606 can store an executing application that includes one or more library software modules, such as those for the Java™ Runtime Environment program for realizing a JVM (Java™ virtual machine).

Figure 7:
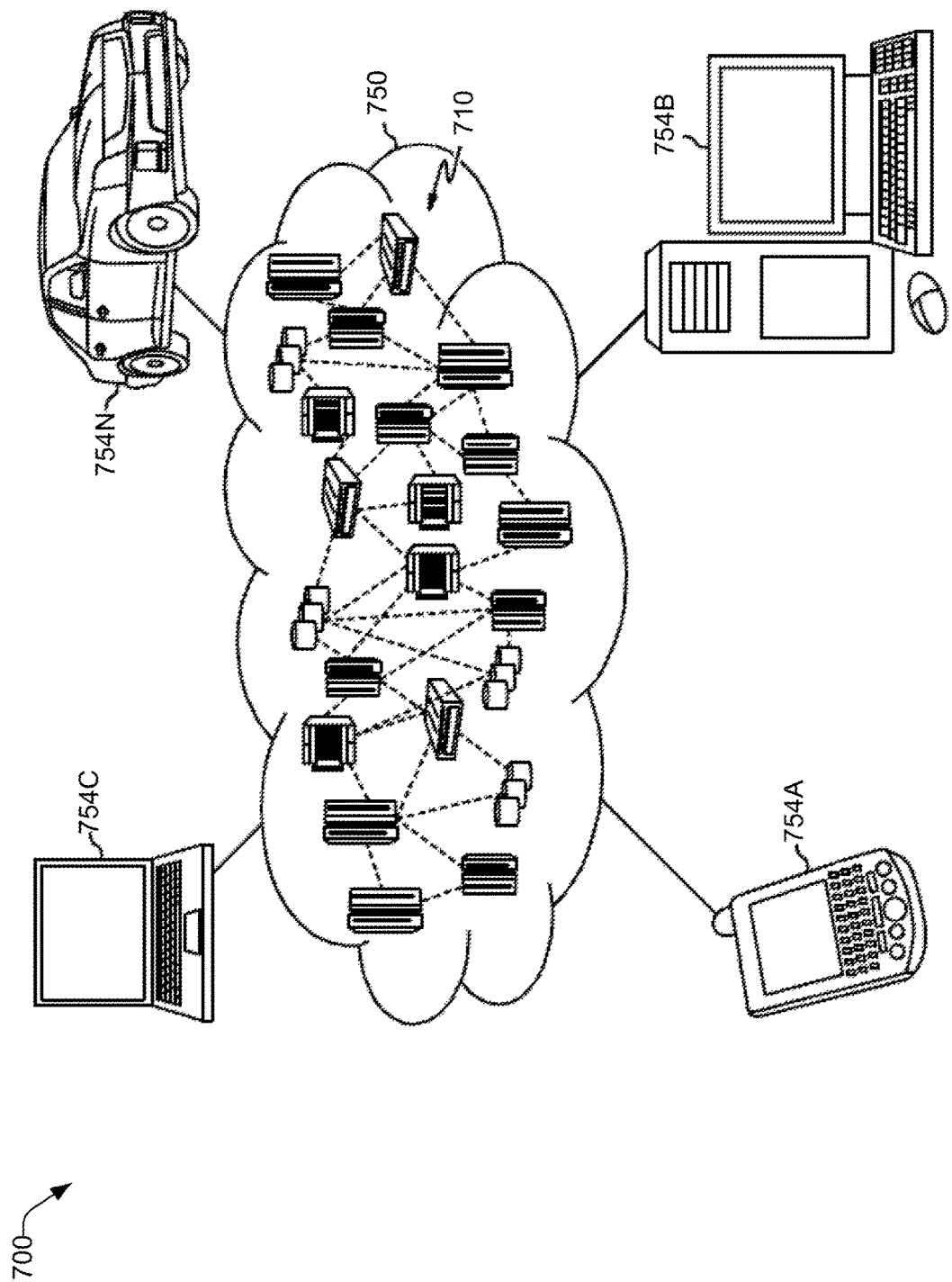
FIG. 7 depicts a cloud computing environment, consistent with an illustrative embodiment.

Referring now to FIG. 7, an illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
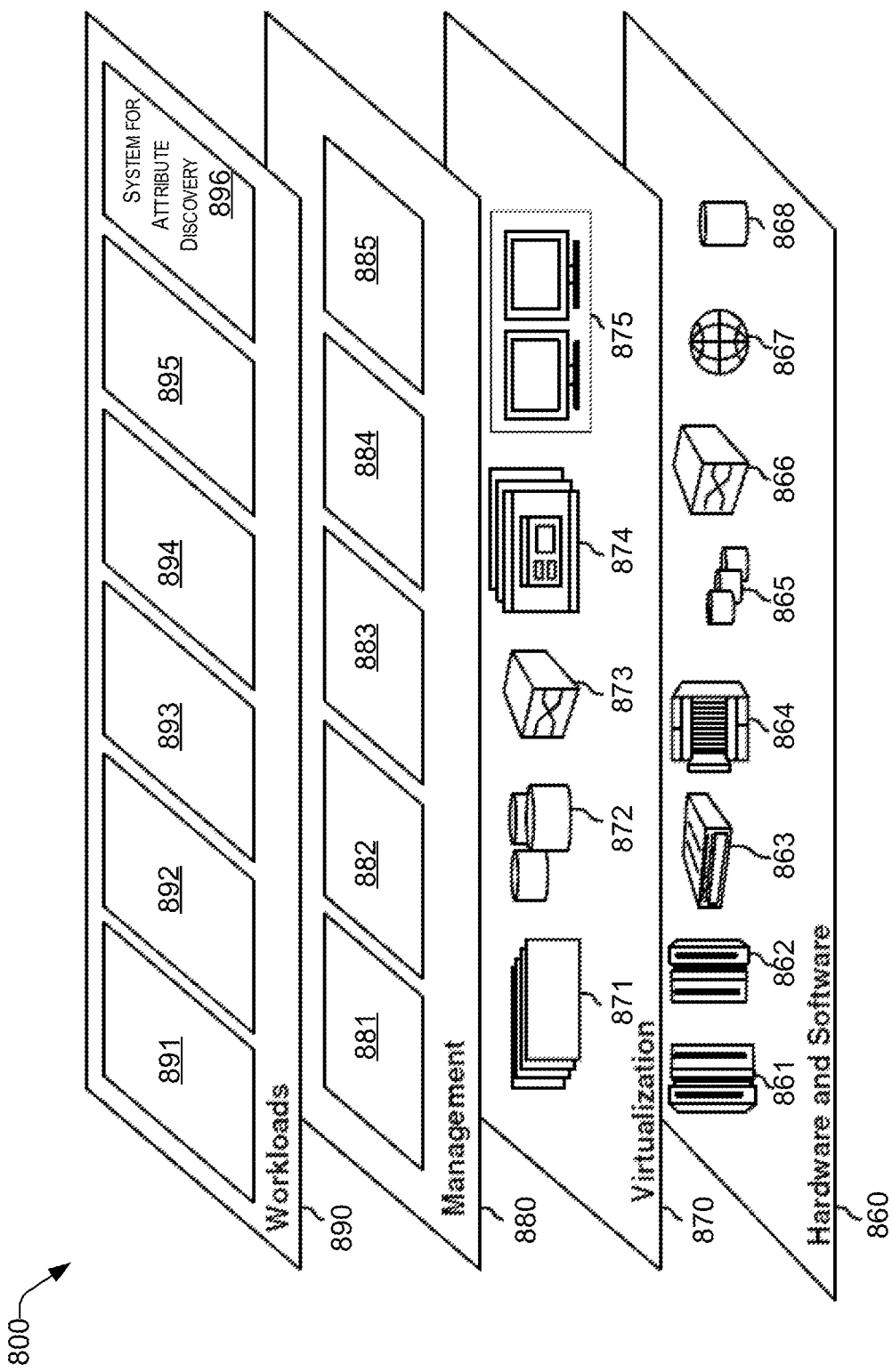
FIG. 8 depicts abstraction model layers, consistent with an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and a system for attribute discovery 896 for operation objects for operation data 896, as discussed herein.

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of attribute discovery for operation objects from operation data, the method comprising:
   segmenting a name of each of a plurality of operation objects based on one or more special characters used in the name of each operation object;
   performing a similarity comparison of the operation objects by extracting common subsequences from substrings of operation data in a same log as a target object;
   computing a string similarity of the extracted common subsequences to compare a maximum number and position of one or more subsequences in each substring to generate a matching value indicating an amount of a match of the one or more subsequences;
   determining attributes by calculating statistical metrics for fields in the log;
   performing complex attribute mining of structured attributes including one or more of a sequence, a sub-graph, or a sub-set of the operation data;
   stitching the fields of the structured attributes; and
   identifying additional information of the operation objects based on the determined attributes and the matching value.

2. The computer-implemented method according to claim 1, wherein the attribute discovery is performed automatically in real time without a predetermined identification information regarding names of fields in the log and a relationship among the fields in the log.

3. The computer-implemented method according to claim 1, wherein the determining attributes by calculating statistical metrics includes rendering text attributes.

4. The computer-implemented method according to claim 1, wherein the determining attributes by calculating statistical metrics includes rendering numerical attributes.

5. The computer-implemented method according to claim 1, wherein:
   the determining attributes by calculating statistical metrics renders sequence attributes; and
   the extracting common sequences from the operation data includes finding one or more common subsequences in the log having a longest length.

6. The computer-implemented method according to claim 1, wherein the stitched fields of the structured attributes include values at different timestamps revealing operations using attributes obtained from a sequence mining.

7. The computer-implemented method according to claim 1, further comprising:
   identifying multiple successor entities for a target entity;
   computing an occurrence of times of each entity in a successor group; and
   identifying a type of substructure for the successor group.

8. The computer-implemented method according to claim 7, wherein the identifying of the type of substructure for the successor group comprising identifying a forked sequence substructure or a sequential sequence substructure.

9. A system for attribute discovery of operation objects from operation data, the system comprising:
- a word segmentation module configured to segment a name of each of a plurality of operation objects based on one or more special characters used in the name of each operation object;
- a similarity comparison module configured to compare the operation objects by extracting common subsequences from substrings of operation data in a same log as a target object, and to compute a string similarity of the extracted common subsequences to compare a maximum number and position of the common subsequences in each string to generate a matching value indicating an amount of a match of the extracted common subsequences;
- a sub-structure extraction module configured to perform:
  - a complex attribute mining of structured attributes including one or more of a sequence, a sub-graph, or a sub-set of the operation data; and
  - stitch the fields of the structured attributes; and
- a statistical analysis and computation module configured to determine attributes by calculating statistical metrics for fields in the log, and to identify additional information of the operation objects based on the determined attributes and the generated matching value.

10. The system for attribute discovery according to claim 9, wherein the attribute discovery is performed automatically in real time without a predetermined identification information regarding names of fields in the log and a relationship among the fields in the log.

11. The system for attribute discovery according to claim 9, wherein the determined attributes comprise numerical attributes.

12. The system for attribute discovery according to claim 9, wherein the determined attributes comprise text attributes.

13. The system for attribute discovery according to claim 9, wherein:
- the determined attributes comprise sequence attributes; and
- the similarity comparison module is configured to extract one or more common subsequences from the substrings of operation data in the log having a longest length.

14. The system for attribute discovery according to claim 9, wherein the stitched fields of the structured attributes include values at different timestamps revealing operations using attributes obtained from a sequence mining.

15. The system for attribute discovery according to claim 14, further comprising:
- a sequence discovery module is configured to identify multiple successor entities for a target entity;
- a candidate successor generation module is configured to compute an occurrence of times of each entity in a successor group; and
- wherein the sub-structure extraction module is configured to identify a type of substructure for the successor group.

16. The system for attribute discovery according to claim 15, wherein the sub-structure extraction module is further configured to identify the type of substructure for the successor group as a forked sequence substructure or a sequential sequence substructure.

17. A non-transitory computer readable storage medium tangibly embodying a computer readable program code having computer readable instructions that, when executed, causes a computer device to perform a method of attribute discovery for operation objects from operation data, the method comprising:
- segmenting a name of each of a plurality of operation objects based on one or more special characters used in the name of each operation object;
- performing a similarity comparison of the operation objects by extracting common subsequences from substrings in operation data in a same log as a target object;
- computing a string similarity of the extracted common subsequences to compare a maximum number and position of the common subsequences in each substring to generate a matching value indicating an amount of a match of the extracted common subsequences;
- determining attributes of each string by calculating statistical metrics for fields in the log;
- performing a complex attribute mining of structured attributes including one or more of a sequence, a sub-graph, or a sub-set of the operation data; and
- stitching the fields of the structured attributes; and
- discovering additional information of the operation objects based on the determined attributes and the generated matching value.

* * * * *